United States Patent [19]

Béchade

[11] Patent Number: 5,745,744
[45] Date of Patent: Apr. 28, 1998

US005745744A

[54] HIGH SPEED MASK GENERATION USING SELECTION LOGIC

[75] Inventor: Roland Albert Béchade, Burlington, Vt.

[73] Assignee: International Business Machines Corporation, Armonk, N.Y.

[21] Appl. No.: 542,478

[22] Filed: Oct. 12, 1995

[51] Int. Cl.⁶ .................................................... G06F 7/00
[52] U.S. Cl. .................... 395/565; 364/929.2; 364/947; 364/947.1; 364/947.4; 364/950; 364/950.4
[58] Field of Search ....................... 395/565; 364/715.08, 364/748, DIG. 1, DIG. 2, 929.2, 947.1, 947.4, 950, 950.4

[56] References Cited

U.S. PATENT DOCUMENTS

| | | | |
|---|---|---|---|
| H1222 | 8/1993 | Brown et al. | 364/748 |
| 4,012,722 | 3/1977 | Gajski et al. | 395/565 |
| 4,139,899 | 2/1979 | Tulpule et al. | 395/565 |
| 4,180,861 | 12/1979 | Armstrong et al. | 395/565 |
| 4,396,994 | 8/1983 | Kang et al. | 364/715.08 |
| 4,569,016 | 2/1986 | Hao et al. | 395/565 |
| 4,583,197 | 4/1986 | Chappell et al. | 364/715.08 |
| 4,807,172 | 2/1989 | Nukiyama | 364/715.08 |
| 4,831,571 | 5/1989 | Tokumaru | 364/715.08 |
| 4,839,839 | 6/1989 | Tokumaru et al. | 364/715.08 |
| 4,870,563 | 9/1989 | Oguchi | 395/565 |
| 4,945,509 | 7/1990 | Barrett et al. | 395/565 |
| 4,984,189 | 1/1991 | Neki | 364/715.08 |
| 5,020,013 | 5/1991 | Maher, III et al. | 364/715.08 |
| 5,099,445 | 3/1992 | Studor et al. | 364/715.08 |
| 5,129,066 | 7/1992 | Schmookler | 395/565 |
| 5,155,698 | 10/1992 | Niimi | 364/715.08 |
| 5,166,898 | 11/1992 | Ishihara | 364/748 |
| 5,274,830 | 12/1993 | Asano | 395/565 |
| 5,309,382 | 5/1994 | Tamura et al. | 364/715.08 |
| 5,341,319 | 8/1994 | Madden et al. | 364/748 |
| 5,379,240 | 1/1995 | Byrne | 364/715.08 |
| 5,678,058 | 10/1997 | Sato | 395/565 |

FOREIGN PATENT DOCUMENTS

| | | |
|---|---|---|
| 61-161583 | 7/1986 | Japan. |
| 3-042969 | 2/1991 | Japan. |
| 4-076549 | 3/1992 | Japan. |
| 4-291484 | 10/1992 | Japan. |

OTHER PUBLICATIONS

Bowater, R.J. & West, R.M.P., "Selective Negator," IBM Technical Disclosure Bulletin, vol. 30, No. 6, Nov. 1987, pp. 434–436.

Stafford, S.K., "Fixed Set of Masks for Feature Extraction Measurements," IBM Technical Disclosure Bulletin, vol. 18, No. 2, Jul. 1975, pp. 369–370.

Buttimer, M.D., Gay, A.C. & West, R.M.P., "Multiprecision Barrel Shifter," IBM Techincal Disclosure Bulletin, vol. 32, No. 9A, Feb. 1990, pp. 334–337.

(List continued on next page.)

*Primary Examiner*—Meng-ai T. An
*Attorney, Agent, or Firm*—Heslin & Rothenberg, P.C.

[57] ABSTRACT

In a mask generator, decoders are provided for decoding respective portions of an input bit string into an intermediate string, and first and second selection signals. The intermediate string is placed into a first mask by a primary selection stage according to the first selection signals. The first mask is placed into a second mask by a secondary selection stage according to the second selection signals. The decoders are implemented using combinational logic, and the primary selectors are implemented using multiplexer and phase inverter circuits. Sixteen bit mask generation is realized from a 4-bit input string using only two decoders and a primary selector. Sixty-four bit mask generation is realized using a 6-bit input bit string and a secondary selector. The first and second masks contain two contiguous series of 1s and 0s. Parallel arrangements of mask generators are disclosed so that alternating series of 1s and 0s can be placed in output masks. Masks of arbitrary lengths can be produced using additional decoding and selectors.

31 Claims, 8 Drawing Sheets

OTHER PUBLICATIONS

Huffman, A.E., "RMU Mask Generator From Shift Amount or Pad/Start/End Specifications," IBM Technical Disclosure Bulletin, vol. 32, No. 5B, Oct. 1989, pp. 197–204.Butler, N.D. & Jones, J.W., "Barrel Shifter Rotator," IBM Technical Disclosure Bulletin, vol. 29, No. 9, Feb. 1987, pp. 3883–3888.

Finney, D.W. & Olsson, B., "Using a Common Barrel Shifter for Operand Normalization, Operand Alignment and Operand Unpack and Pack in Floating Point," IBM Technical Disclosure Bulletin, vol. 29, No. 2, Jul. 1986, pp. 699–701.

Awsienko, O., Blake, S.P. & Nahata, P., "Branch Bit Testing Using Rotate, Mask Generate and Merge Operations," IBM Technical Disclosure Bulletin, vol. 28, No. 8, Jan. 1986, pp. 3378–3380.

Cannon, J.W., Finney, D.W. & Rave, W.C., "Processor Unit Mask Generation Control," IBM Technical Disclosure Bulletin, vol. 27, No. 11, Apr. 1985, pp. 6419–6421.

Schaughency, M.F., "Partial Parity Predict for CPU Having Architectural Rotate and Mask/Merge Unit," IBM Technical Disclosure Bulletin, vol. 23, No. 9, Feb. 1981, pp. 4126–4127.

TO FIG. 4B

HIGH SPEED MASK GENERATION USING SELECTION LOGIC

TECHNICAL FIELD

This invention relates to microprocessor systems. More particularly, this invention relates to a mask generator for producing a mask from an input bit string, the mask for use in microprocessor operations.

BACKGROUND OF THE INVENTION

In microprocessors, it is sometimes necessary to generate a mask (a string of 1s and 0s) from a binary input string. The input string indicates the number of 1s or 0s to be inserted in the mask from the high or low order bit position of the mask. A mask generator is thus required for the specific purpose of producing a mask from an input string.

For example, in certain microprocessors, fixed point rotate and shift instructions employ a mask generator. Another example instruction includes transferring floating point numbers from a high precision system (e.g., extended precision) to a low precision system. Single precision or double precision denormal numbers are generated. In the process of converting the numbers to denormal, rounding may be required. To convert a 64-bit mantissa to denormal, a shift right operation is performed, and all the bits below the guard bits are lost. For rounding, a zero detect operation is required for all the bits to be shifted out, to thereby generate a sticky bit. The entire operation is performed by generating a mask, ANDing it with the entire mantissa, and then performing a zero detect operation on the 64-bit modified mantissa. A mask is generated to perform a zero detect on the bits to be dropped, in parallel with the shift operation, using the same control information as the right shifter.

Thus, the masks employed in the above described operations may be 64 bits long, and consist of bits set to a first value from a start bit through and including a stop bit, and bits set to a second value elsewhere. The location of the stop bit can be described by a value in the range from 0 to 63.

Because mask generation is an integral part of the above described operations, and because there are always performance and size concerns in microprocessor systems, it is desirable to implement an efficient mask generator in as little area as possible. Thus, logic included in a mask generator should be compact, and should have a small overall delay.

An exemplary prior art approach to mass generation is disclosed in U.S. Pat. No. 5,129,066 to Schmookler. FIG. 3 in Schmookler depicts a generator for producing a 16-bit mask from a 4-bit input string. A significant amount of combinational circuitry is employed in the AOI and OAI circuits of this generator, resulting in increased area and delays.

What is needed, therefore, is a mask generator which overcomes the deficiencies of the prior art, which has few delays, and which can be implemented in a smaller area within a microprocessor or similar component.

SUMMARY OF THE INVENTION

The invention, in one aspect, is a method and system for generating a mask from an input string, the input string including at least first and second portions. The method includes decoding the first portion of the input string into an intermediate string having a first length, and positioning the intermediate string at a position in a first mask according to the value of the second portion of the input string. The first mask has a second length, the second length being greater than the first length. The decoding may include setting N contiguous bits in the intermediate string to a first binary value, N being derived from the value of the first portion of the input string.

The method may further include setting any low order bits remaining in the first mask to a first binary value, and setting any high order bits remaining in the first mask to a second binary value.

The input string may include a third portion, in which case the method further includes positioning the first mask at a position in a second mask according to the value of the third portion of the input string. The second mask has a third length, the third length being greater than the second length. Any low order bits remaining in the second mask are set to a first binary value, and any high order bits remaining in the second mask are set to the second binary value.

The method may include, for a different input string, performing the steps of decoding, positioning another intermediate string, and positioning another first mask, thereby generating a third mask; and concatenating the second mask and the third mask thereby generating a fourth mask.

In another aspect, the invention is a mask generator including a first selector having at least one input for a first string, and an output for providing a first mask, the first mask having first, second and third portions. The first selector includes: a first stage for selectively providing in the first portion of the first mask the first string or a string of first values; a second stage for selectively providing in the second portion of the first mask the first string, the string of first values, or a string of second values; and a third stage for selectively providing in the third portion of the first mask a first string or the string of second values.

The input string may include at least first and second portions, in which case the mask generator further includes a first decoder having an input for the first portion of the input string and an output, the first decoder including logic for decoding the first portion of the input string into the first string. Selection signals may be derived from the second portion of the input string and applied to the first selector, in which case the mask generator includes a second decoder having an input for the second portion of the input string and an output, the second decoder including logic for decoding the second portion of the input string into the selection signals. The input string may include the third portion, in which case the mask generator may include a second selector having at least one input for the first mask, and an output for providing a second mask, the second selector placing the first mask in the second mask at a position derived from the third portion of the input string.

In yet another aspect, the invention is a mask generator for producing an output mask from an input bit stream, the input bit stream having at least first and second portions. The mask generator includes a first primary selector for producing an intermediate mask, the intermediate mask being smaller than the output mask, wherein the first primary selector places at least one bit in the intermediate mask at a position derived from the first portion of the input bit string.

The mask generator also includes a secondary selector coupled to the first primary selector for producing the output mask, the secondary selector placing the intermediate mask in the output mask at a position derived from the second portion of the input bit string.

The present invention, by providing logic delays associated only with first stage decoder circuits, and subsequent stages of selection or multiplexing circuits, overcomes the deficiencies of the prior art in that a smaller area and fewer delays are realized for a mask generator in a microprocessor or similar component.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

DESCRIPTION OF THE PREFERRED EMBODIMENT(S)

Figure 1A:
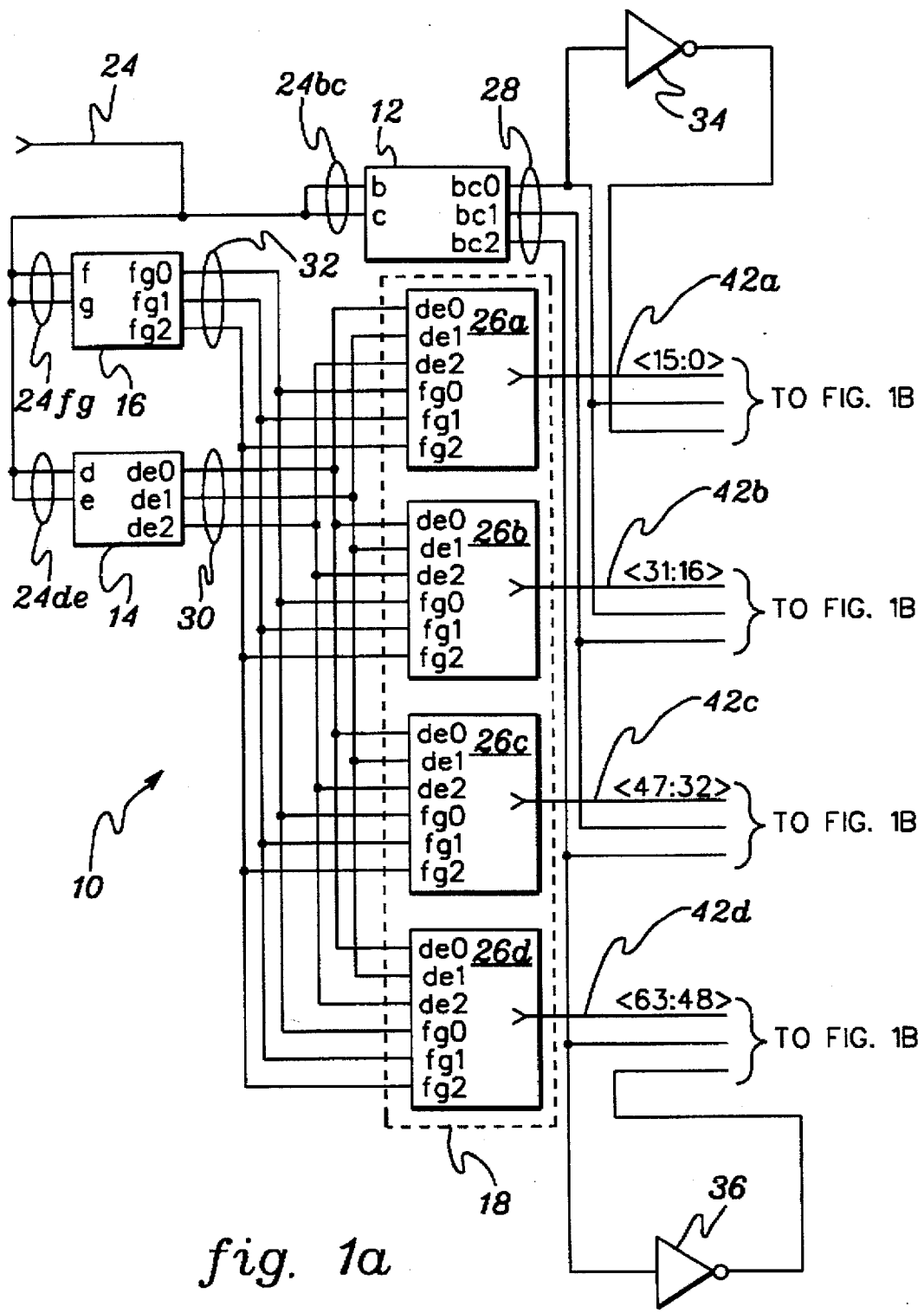
FIGS. 1a–b depict a mask generator formed in accordance with the principles of the present invention.
Figure 1B:
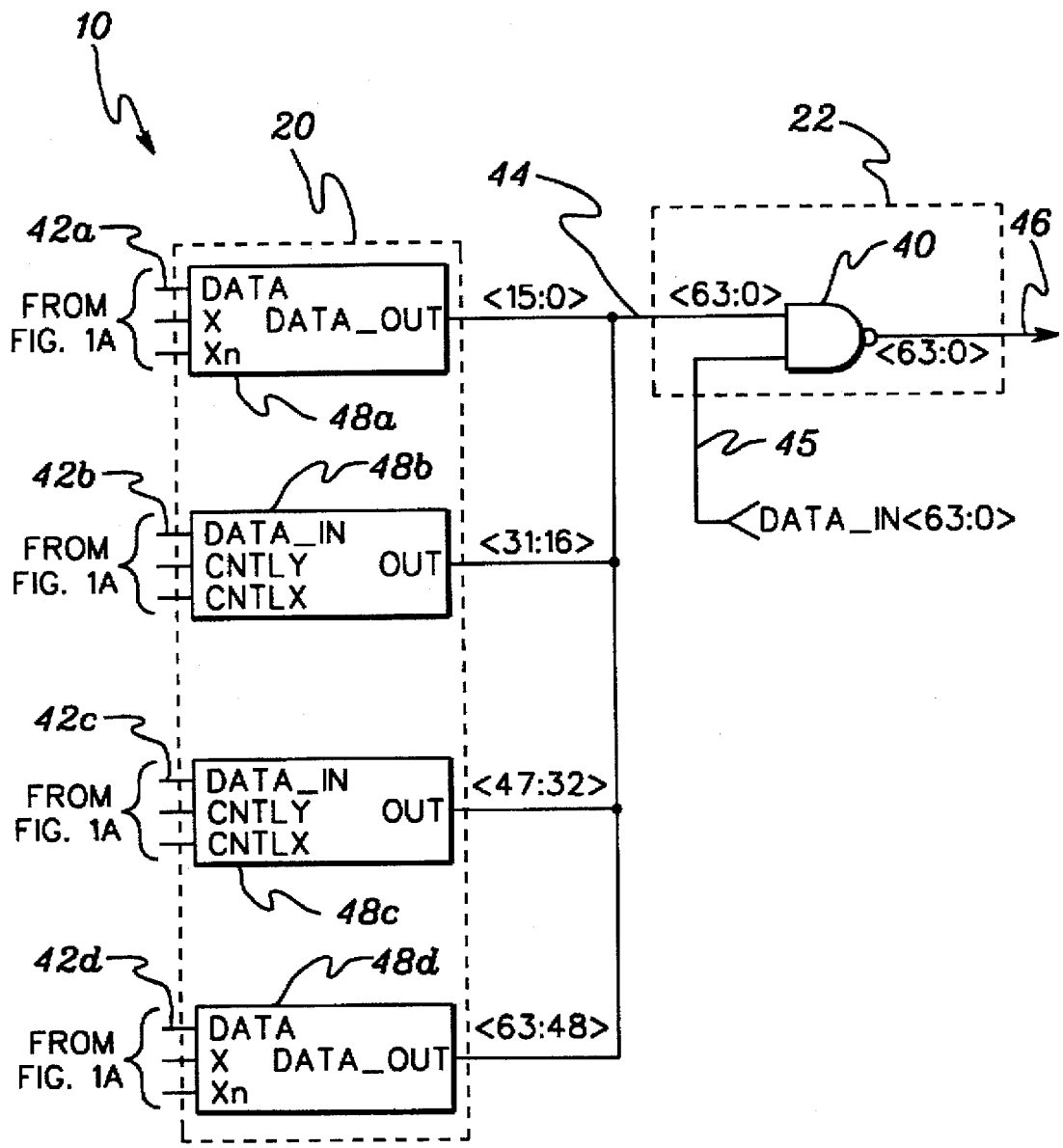

With reference to FIGS. 1a–b, depicted therein is an exemplary 64-bit mask generator formed in accordance with the principles of the present invention. The mask generator 10 generally includes decoders 12, 14 and 16, a group 18 of primary selectors 26a–d, and a secondary selector 20. These portions of the mask generator produce a 64-bit output mask 44 from a 6-bit input bit string 24.

Also depicted in FIG. 1b is an exemplary circuit 22 in which 64-bit mask 44 is used to process a 64 bit data stream 45. This circuit includes NAND gate 40 to process the 64 bits of output mask 44. Processed output 46 is provided.

The input bit string 24 is 6 bits long and includes three 2-bit portions, 24bc, 24de and 24fg. Each of these 2-bit portions of the input bit string is applied to a respective decoder 12, 14 or 16. Each decoder produces a 3-position output based on its respective 2-position input. These 3-position outputs are thus derived from the 2-position inputs by each respective decoder. Decoders 12 and 14 are similarly formed, and are discussed below with reference to FIG. 3. Decoder 16 is formed differently than decoders 12 and 14, and is discussed below with reference to FIG. 2. The outputs 32 of decoder 16 as discussed below, form an intermediate bit string to be positioned in masks 42a–d by respective primary selectors 26a–d. The position in the mask is controlled by outputs 30 from decoder 14.

Pursuant to the principles of the present invention, primary selector 26a, for example, is formed such that the 3-position intermediate string 32 (along with a fixed trailing 0 or 1) is placed in a 16-bit output mask 42a according to the value 30 derived by decoder 14 from the portion 24de of input bit string 24.

Further, and in accordance with the principles of the present invention, similarly formed selectors 26a–d are provided, and a secondary selector 20 is provided which takes as its inputs the 16-bit intermediate masks 42a–d, and places an intermediate mask at a position in the 64-bit output mask 44. This position is defined by the selection signals 28 decoded by decoder 12 from the portion 24bc of input bit string 24.

The structure of the selectors is discussed below with reference to FIGS. 4a–b and 5a–c.

Figure 2:
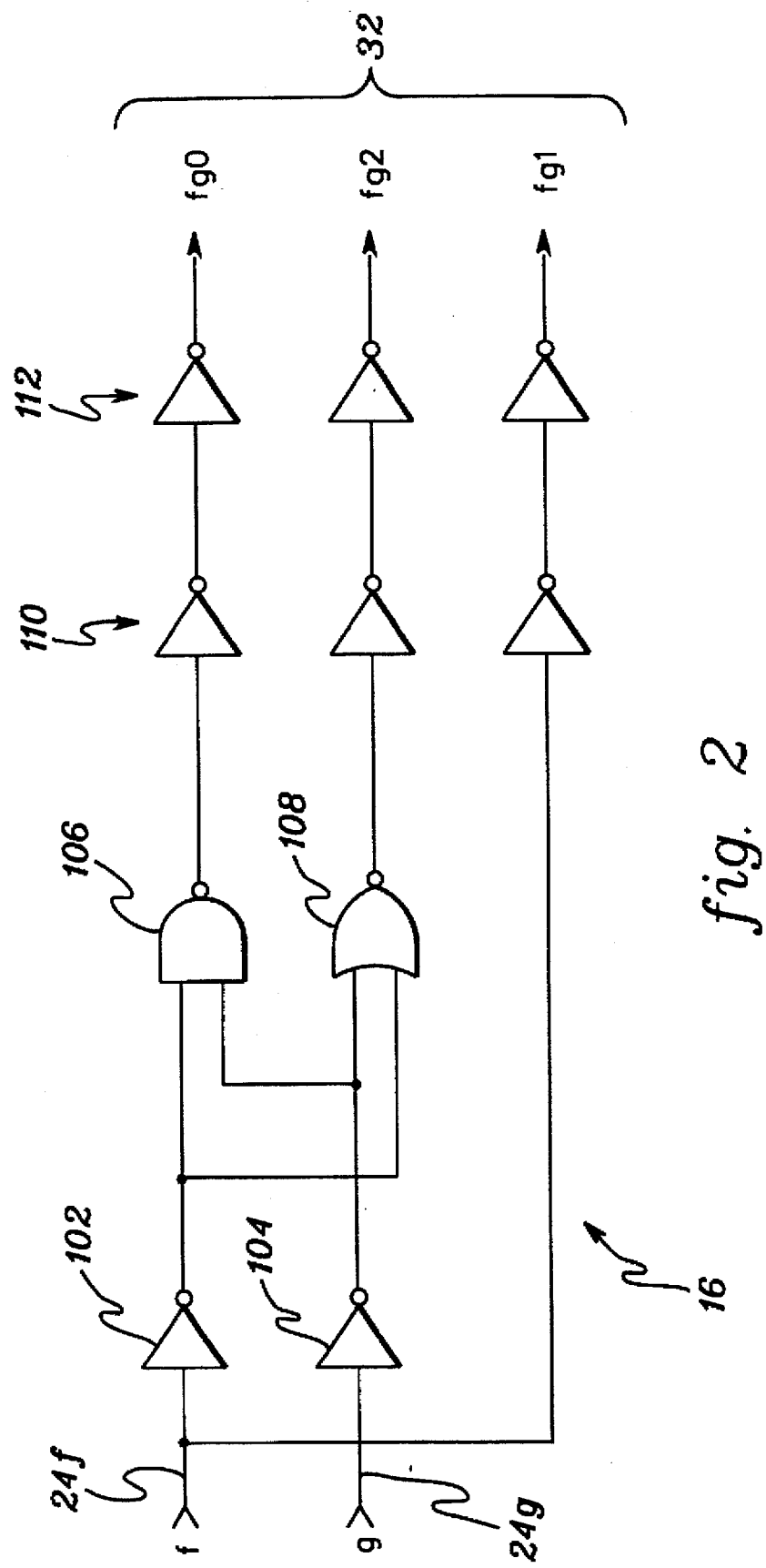
FIG. 2 depicts a decoder for decoding a portion of an input bit string and providing an intermediate bit string, in accordance with the principles of the present invention.

With reference to FIG. 2, depicted therein is an exemplary decoder 16 from the mask generator 10 of FIG. 1a (Like reference numerals are used to denote like elements throughout the Figures). The decoder circuit accepts bits 24f and 24g of the input string 24, which are applied to a first logic level including inverters 102 and 104, and a second logic level including NAND 106 and NOR 108. The additional levels of inversion 110 and 112 could be excluded merely by implementing larger NAND and NOR gates 106 and 108. Those skilled in the art will recognize that the exemplary decoder 16 converts the input signals 24f and 24g into the output signal 32 (fg0, fg1 and fg2) according to the truth table in Table 1 shown below:

TABLE 1

| f | g | fg3 | fg2 | fg1 | fg0 |
|---|---|-----|-----|-----|-----|
| 0 | 0 | 0   | 0   | 0   | 0   |
| 0 | 1 | 0   | 0   | 0   | 1   |
| 1 | 0 | 0   | 0   | 1   | 1   |
| 1 | 1 | 0   | 1   | 1   | 1   |

As discussed below, fg3 will be set to 0, independent of the input bit string values, thus resulting in a 4-bit intermediate bit string. Table 1 shows that the decoder provides a number N of contiguous 1s, the number N corresponding to the value of the input string fg.

Figure 3:
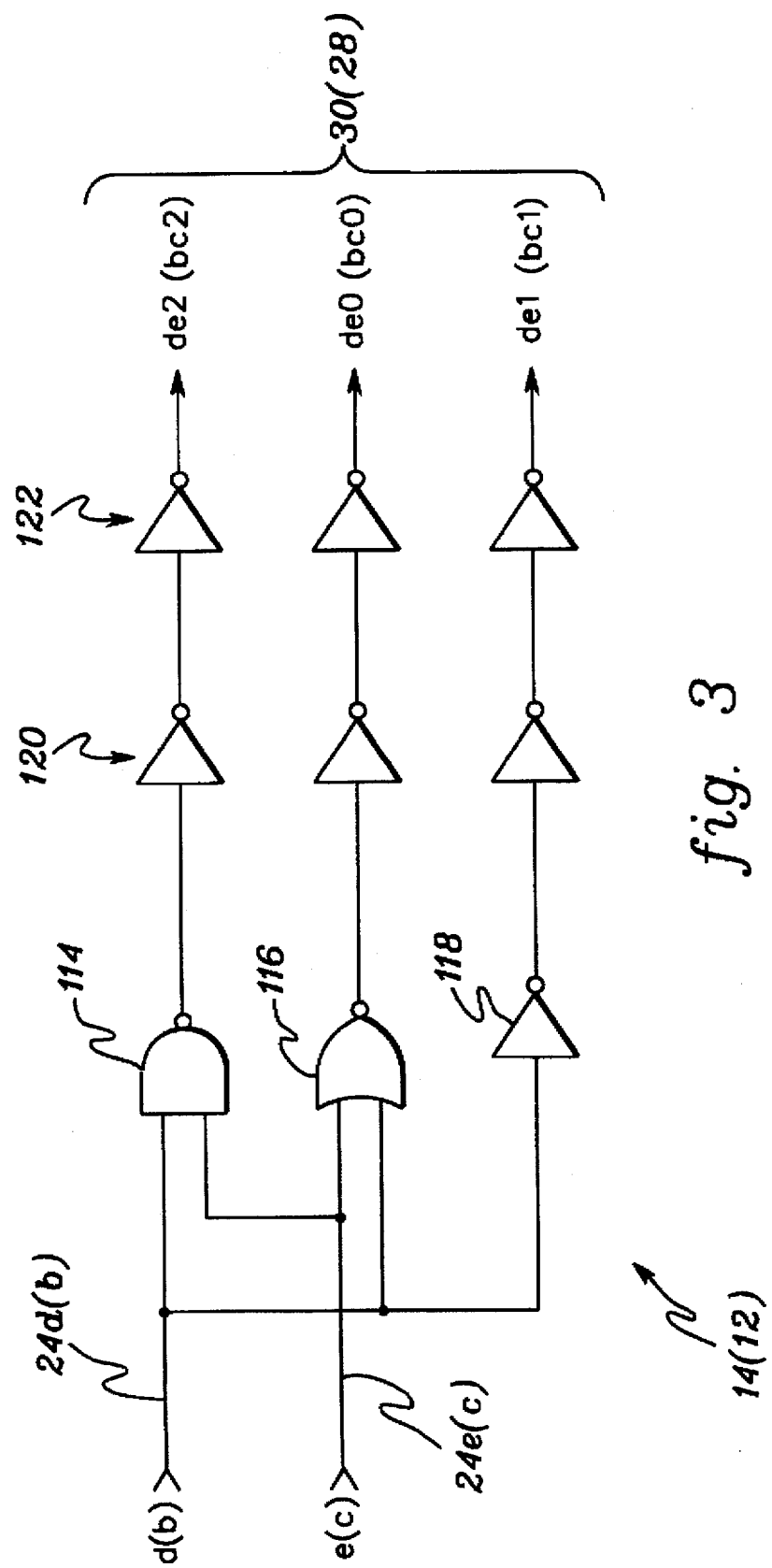
FIG. 3 depicts a decoder for decoding a portion of an input bit string and providing selection signals in accordance with the principles of the present invention.

With reference to FIG. 3, shown therein is an exemplary decoder 14 or 12, employed in the mask generator 10 of FIG. 1. This exemplary decoder takes as input signals the portions of the input bit string 24d or b, and 24e or c and includes one level of logic comprising NAND 114, NOR 116 and inverter 118. Again, the inverters 120 and 122 can be eliminated by providing larger preceding gates. Those skilled in the art will recognize that the decoder of FIG. 3 converts the input signals 24d or b and 24e or c to output signals 30 or 28 (de0, de1 and de2 or bc0, bc1 and bc2) according to the truth table shown in Table 2 below:

TABLE 2

| d | e | de0 | de1 | de2 |
|---|---|-----|-----|-----|
| 0 | 0 | 1   | 1   | 1   |
| 0 | 1 | 0   | 1   | 1   |
| 1 | 0 | 0   | 0   | 1   |
| 1 | 1 | 0   | 0   | 0   |

Figure 4A:
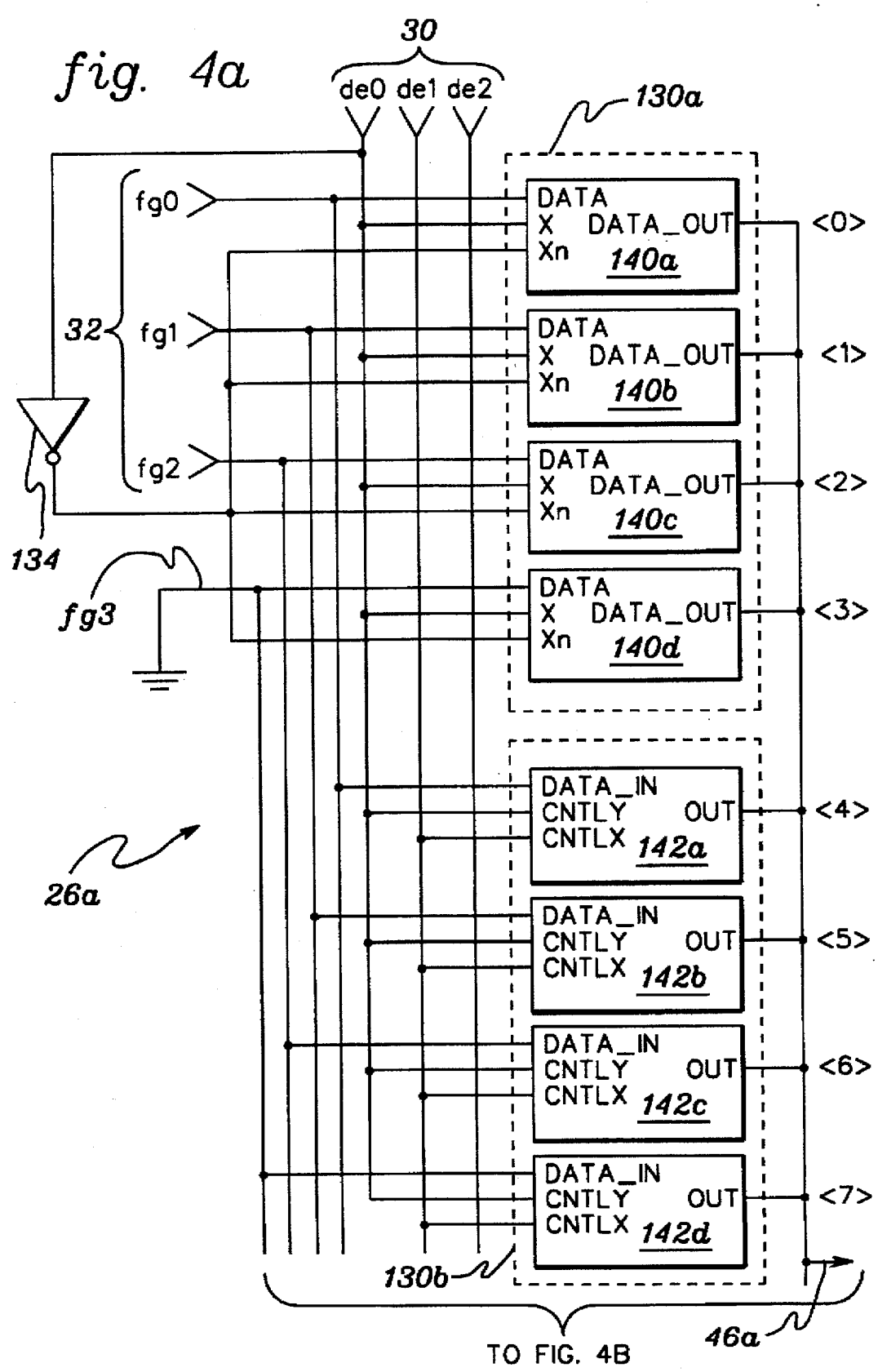
FIGS. 4a–b depict a primary selector formed in accordance with the principles of the present invention.
Figure 4B:
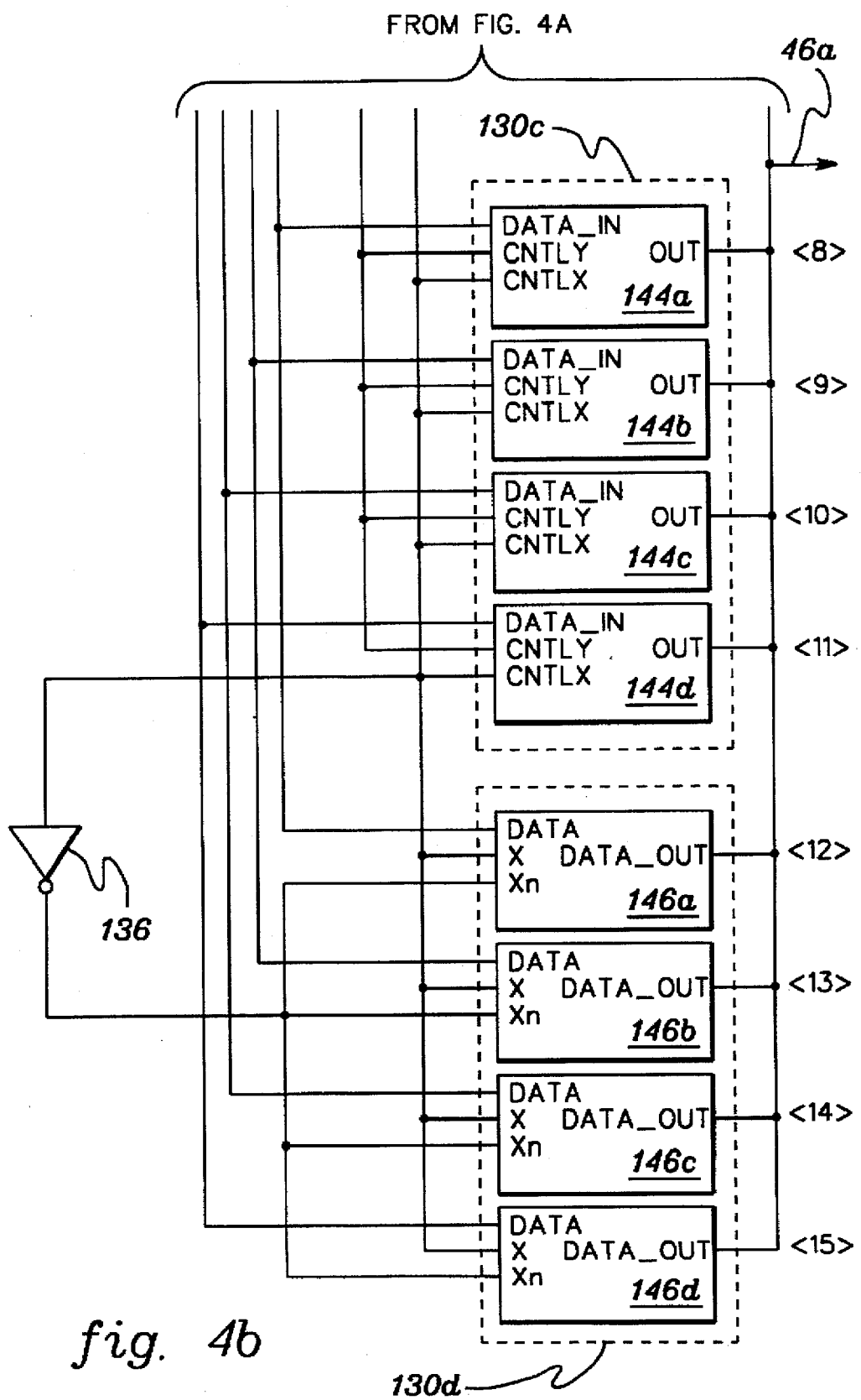

With reference to FIGS. 4a–b, shown therein is an exemplary primary selector 26a employed in the mask generator 10 of FIGS. 1a–b. Selector 26a accepts as inputs the decoded selection signals 30 from decoder 14 of FIG. 1a, and the decoded signals or intermediate bit string 32 from decoder 16 of FIG. 1a. Selector 26a includes four stages 130a–d. Each stage 130 corresponds to a 4-bit portion of the 16-bit output mask 46a. Stage 130a is associated with output bits 0–3, stage 130b is associated with output bits 4–7, stage 130c is associated with output bits 8–11 and stage 130d is associated with output bits 12–15. In general, stage 130a selects between applying to each respective four output positions a string of binary 1s or the intermediate bit string 32 (including a 0 bit fg3). Stages 130b and 130c select between providing, in their respective 4-bit portions of output mask 46a, a string of 1s, a string of 0s, or the intermediate string 32 (again along with a ground or 0 bit fg3). Finally, stage 130d places in its four positions either the intermediate bit string 32 (with 0 bit fg3) or a string of 0s.

The stages 130a–d are controlled by selection signals 30 such that only one stage places in its respective 4-bit portion of the output mask 46a the intermediate bit string 32. Inverters 134 and 136 are employed to change the polarity of a respective one of the input selection signals 30. Because, as discussed above with reference to FIG. 2, the intermediate bit string is a contiguous series of 0s, or a contiguous series of 0s concatenated with a contiguous series of 1s, the stages of FIGS. 4a–b are controlled such that any higher order positions are set to a first value (0 or 1) and any lower order positions remaining are set to the opposite value (0 or 1). Thus, the output mask 46a will include a contiguous series of first values and a contiguous series of second values, the separation between the two contiguous series being defined by the selection signals 30.

The circuits 140a–d comprising stage 130a are all similarly formed, as they are required to select between providing a 0 or a bit from the intermediate bit string in their respective positions of the output mask 46a. This circuit is discussed below with reference to FIG. 5a. Circuits 142a–d and 144a–d of stages 130b and 130c are similarly formed, as they are required to select either between a 0, 1 or a bit from the intermediate bit string for their respective positions of the output mask 46a. Circuits 142a–d and 144a–d are discussed below with reference to FIG. 5b. Circuits 146a–d of stage 130d are all similarly formed, as they are required to select between a 0 or a bit from the intermediate bit string for their respective positions of the output mask 46a. Circuits 146a–d are discussed below with reference to FIG. 5c. Tables 3a–d below represent the truth tables for the respective stages 130a–d (the notation "*" merely denotes the signals derived from the fg input, i.e. fg 0-3).

TABLE 3a

Stage 130a

| d | e | out (0:3) |
|---|---|-----------|
| 0 | 0 | "*" |
| 0 | 1 | "1" |
| 1 | 0 | "1" |
| 1 | 1 | "1" |

TABLE 3b

Stage 130b

| d | e | out (4:7) |
|---|---|-----------|
| 0 | 0 | "0" |
| 0 | 1 | "*" |
| 1 | 0 | "1" |
| 1 | 1 | "1" |

TABLE 3c

Stage 130c

| d | e | out (8:11) |
|---|---|------------|
| 0 | 0 | "0" |
| 0 | 1 | "0" |
| 1 | 0 | "*" |
| 1 | 1 | "1" |

TABLE 3d

Stage 130d

| d | e | out (12:15) |
|---|---|-------------|
| 0 | 0 | "0" |
| 0 | 1 | "0" |
| 1 | 0 | "0" |
| 1 | 1 | "*" |

Figure 5A:
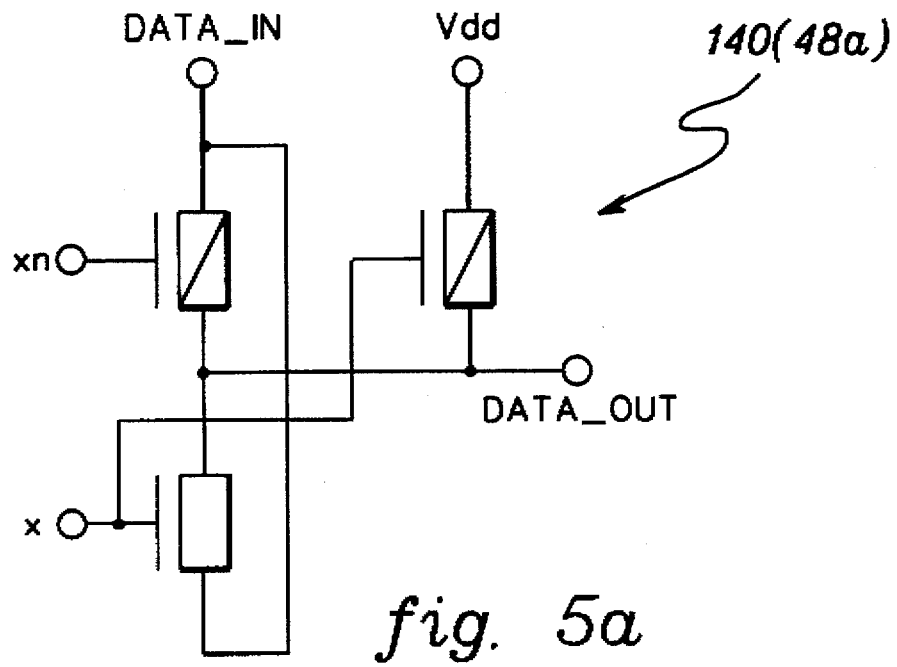
FIGS. 5a, 5b, and 5c depict circuits employed in the primary selector of FIGS. 4a–b, and the secondary selector of FIGS. 1a–b, in accordance with the principles of the present invention.

With reference to FIG. 5a, depicted therein is a CMOS multiplexer circuit of transistors having a data input for a bit of the intermediate bit string, and selection inputs x and xn. Further, an output is provided. Circuits 140a–d of the selector 26a of FIG. 4a each comprise the circuit of FIG. 5a. Those skilled in the art will recognize that the circuit of FIG. 5a operates in accordance with the truth table of Table 4a:

TABLE 4a

| D | x | xn | OUT |
|---|---|----|-----|
| 0 | 0 | 1  | 1   |
| 0 | 1 | 0  | 0   |
| 1 | 0 | 1  | 1   |
| 1 | 1 | 0  | 1   |

Figure 5C:
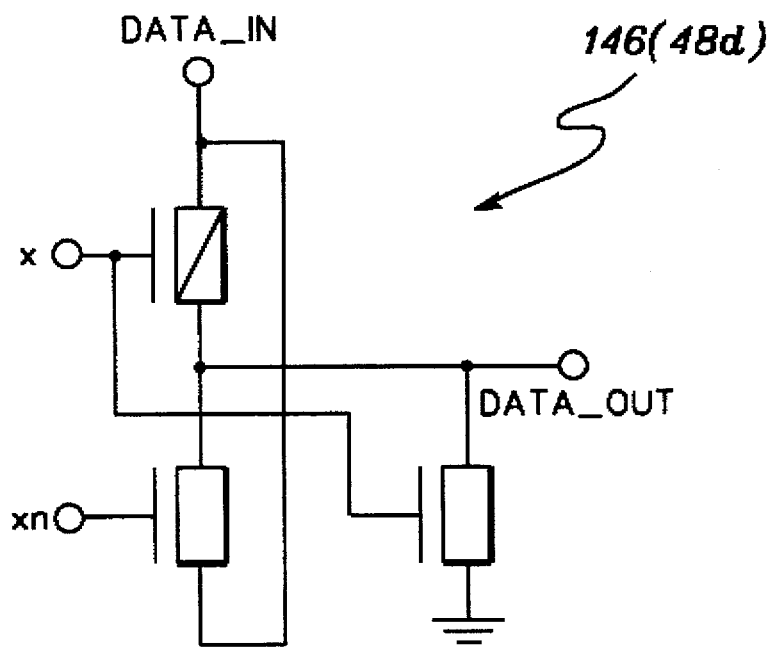
Figure 5B:
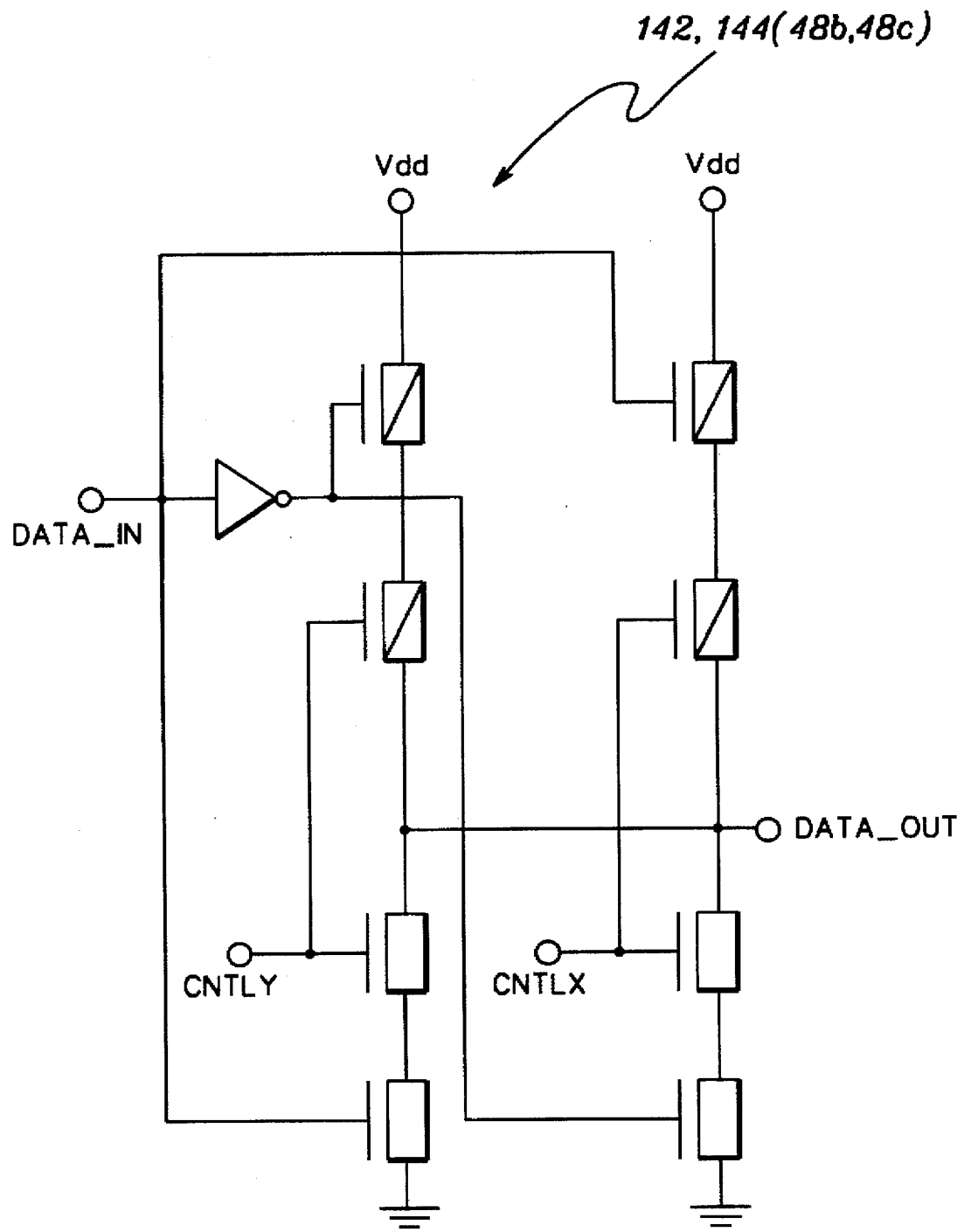

The circuits 142a–d and 144a–d of selector 26a of FIGS. 4a–b each comprise a circuit as shown in FIG. 5b. Shown therein is a CMOS phase inverter circuit which has a data input and selection inputs CNTLX and CNTLY. The circuit thus selects between providing a 1, 0, or the signal present at the data input to the output port. Those skilled in the art will recognize that the circuit of FIG. 5b operates in accordance with the truth table of Table 4b:

TABLE 4b

| D | x | y | OUT |
|---|---|---|-----|
| 0 | 0 | 0 | 1 |
| 0 | 0 | 1 | 1 |
| 0 | 1 | 0 | 0 |
| 0 | 1 | 1 | 0 |
| 1 | 0 | 0 | 1 |
| 1 | 0 | 1 | 0 |
| 1 | 1 | 0 | 1 |
| 1 | 1 | 1 | 0 |

Circuits 146a–d of selector 26a of FIG. 4b each comprise a circuit such as that shown in FIG. 5c. Shown therein is a CMOS multiplexer circuit having a data input D and two selection signals x and xn. Those skilled in the art will recognize that the circuit of FIG. 5c operates in accordance with the truth table of Table 4c:

TABLE 4c

| D | x | xn | OUT |
|---|---|----|-----|
| 0 | 0 | 1  | 0   |
| 0 | 1 | 0  | 0   |
| 1 | 0 | 1  | 1   |
| 1 | 1 | 0  | 0   |

Therefore, the selector 26a of FIGS. 4a–b includes sixteen circuits, each circuit for providing one of the output bits of the resultant 16-bit mask, 46a. The four low order bits are produced by circuits 140a–d, and the high order bits are produced by circuits 146a–d. The eight bits between the low and high order bits are provided by circuits 142a–d and 144a–d. Circuits 140 effectively select between 1s and the intermediate bit string for its respective lower order bits, circuits 142 and 144 effectively select between 0s, 1s or the intermediate bit string for their respective bits, and circuits 146 select between 0s and the intermediate bit string for the high order bits. Thus, the overall operation of selector 26a, and decoders 14 and 16 can be represented by the truth table in Table 5:

from the third portion 24bc of the input bit string 24. Inverters 34 and 36 are employed to change the polarity of a respective one of the selection signals 28. Selector 20 includes stages 48a–d, and its composition is similar to that of a single selector 26, discussed above.

Circuit 48a of selector 20 is replicated 16 times, for each of its 16 low order bits of output mask 44. Each circuit 48a comprises the circuit shown in FIG. 5a. Sixteen copies of circuit 48b and 16 copies of circuit 48c are also provided,

TABLE 5

| INPUTS | | | | OUTPUTS | | | | | | | | | | | | | | | |
|---|---|---|---|---|---|---|---|---|---|---|---|---|---|---|---|---|---|---|---|
| D | E | F | G | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 1 |
| 0 | 0 | 1 | 0 | 0 | 0 | 0 | 0 | 0 | 0 | 0 | 0 | 0 | 0 | 0 | 0 | 0 | 0 | 1 | 1 |
| 0 | 0 | 1 | 1 | 0 | 0 | 0 | 0 | 0 | 0 | 0 | 0 | 0 | 0 | 0 | 0 | 0 | 1 | 1 | 1 |
| 0 | 1 | 0 | 0 | 0 | 0 | 0 | 0 | 0 | 0 | 0 | 0 | 0 | 0 | 0 | 0 | 1 | 1 | 1 | 1 |
| 0 | 1 | 0 | 1 | 0 | 0 | 0 | 0 | 0 | 0 | 0 | 0 | 0 | 0 | 0 | 1 | 1 | 1 | 1 | 1 |
| 0 | 1 | 1 | 0 | 0 | 0 | 0 | 0 | 0 | 0 | 0 | 0 | 0 | 0 | 1 | 1 | 1 | 1 | 1 | 1 |
| 0 | 1 | 1 | 1 | 0 | 0 | 0 | 0 | 0 | 0 | 0 | 0 | 0 | 1 | 1 | 1 | 1 | 1 | 1 | 1 |
| 1 | 0 | 0 | 0 | 0 | 0 | 0 | 0 | 0 | 0 | 0 | 0 | 1 | 1 | 1 | 1 | 1 | 1 | 1 | 1 |
| 1 | 0 | 0 | 1 | 0 | 0 | 0 | 0 | 0 | 0 | 0 | 1 | 1 | 1 | 1 | 1 | 1 | 1 | 1 | 1 |
| 1 | 1 | 1 | 0 | 0 | 0 | 0 | 0 | 0 | 0 | 1 | 1 | 1 | 1 | 1 | 1 | 1 | 1 | 1 | 1 |
| 1 | 1 | 1 | 1 | 0 | 0 | 0 | 0 | 0 | 1 | 1 | 1 | 1 | 1 | 1 | 1 | 1 | 1 | 1 | 1 |
| 1 | 0 | 0 | 0 | 0 | 0 | 0 | 0 | 1 | 1 | 1 | 1 | 1 | 1 | 1 | 1 | 1 | 1 | 1 | 1 |
| 1 | 0 | 0 | 1 | 0 | 0 | 0 | 1 | 1 | 1 | 1 | 1 | 1 | 1 | 1 | 1 | 1 | 1 | 1 | 1 |
| 1 | 1 | 1 | 0 | 0 | 0 | 1 | 1 | 1 | 1 | 1 | 1 | 1 | 1 | 1 | 1 | 1 | 1 | 1 | 1 |
| 1 | 1 | 1 | 1 | 0 | 1 | 1 | 1 | 1 | 1 | 1 | 1 | 1 | 1 | 1 | 1 | 1 | 1 | 1 | 1 |

Those skilled in the art will recognize that the polarity of the table can easily be changed by rearranging the connections in the circuits comprising the mask generator. Thus, in accordance with the principles of the present invention, an intermediate bit string is decoded from a first portion of the input string f and g, and that intermediate string is placed into the 16-bit mask according to a second portion of the input bit string, d and e.

To create a 64-bit mask, certain circuits are merely replicated, and an additional secondary selector is added. With reference to FIGS. 1a–b, a 64-bit output mask 44 is formed by providing additional selectors 26b–d, each having commonly applied signal groups 30 and 32. Thus, four copies of the circuit of FIGS. 4a–b are necessary. The identical 16-bit output strings 42a–d are respectively applied to stages 48a–d within a secondary selector 20. Also applied to secondary selector 20 are selection signals 28 decoded each for the respective 16-bits of the middle portions of the output mask 44. Circuits 48b and 48c comprise the circuit shown in FIG. 5b. Sixteen copies of circuit 48d are provided for the high order 16-bits of output mask 44. Each circuit 48d comprises the circuit shown in FIG. 5c.

Circuits 48a, controlled by selection signals 28, provide either a string of 1s or the input bit string 42a in its respective portion of mask 44. Circuits 48b and c, in accordance with selection signals 28, place the intermediate masks 42b or c, or a string of 0s, or a string of 1s in their respective portions of mask 44. Circuits 48d, in accordance with control signals 28, place either the intermediate mask 42d or a string of 0s in the high order portion of output mask 44. The mask generator comprising decoders 12, 14 and 16, selectors 26a–d and selector 20 operates in accordance with the truth table of Table 6 to create the 64-bit mask:

TABLE 6

| INPUTS | | | | OUTPUTS | | | | | | | | | | | | | | | |
|---|---|---|---|---|---|---|---|---|---|---|---|---|---|---|---|---|---|---|---|
| | | | | 63 | 59 | 55 | 51 | 47 | 43 | 39 | 35 | 31 | 27 | 23 | 19 | 15 | 11 | 7 | 3 |
| B | C | D | E | 60 | 56 | 52 | 48 | 44 | 40 | 36 | 32 | 28 | 24 | 20 | 16 | 12 | 8 | 4 | 0 |
| 0 | 0 | 0 | 0 | 0 | 0 | 0 | 0 | 0 | 0 | 0 | 0 | 0 | 0 | 0 | 0 | 0 | 0 | 0 | * |
| 0 | 0 | 0 | 1 | 0 | 0 | 0 | 0 | 0 | 0 | 0 | 0 | 0 | 0 | 0 | 0 | 0 | 0 | * | 1 |
| 0 | 0 | 1 | 0 | 0 | 0 | 0 | 0 | 0 | 0 | 0 | 0 | 0 | 0 | 0 | 0 | 0 | * | 1 | 1 |
| 0 | 0 | 1 | 1 | 0 | 0 | 0 | 0 | 0 | 0 | 0 | 0 | 0 | 0 | 0 | 0 | * | 1 | 1 | 1 |
| 0 | 1 | 0 | 0 | 0 | 0 | 0 | 0 | 0 | 0 | 0 | 0 | 0 | 0 | 0 | * | 1 | 1 | 1 | 1 |
| 0 | 1 | 0 | 1 | 0 | 0 | 0 | 0 | 0 | 0 | 0 | 0 | 0 | 0 | * | 1 | 1 | 1 | 1 | 1 |
| 0 | 1 | 1 | 0 | 0 | 0 | 0 | 0 | 0 | 0 | 0 | 0 | 0 | * | 1 | 1 | 1 | 1 | 1 | 1 |
| 0 | 1 | 1 | 1 | 0 | 0 | 0 | 0 | 0 | 0 | 0 | 0 | * | 1 | 1 | 1 | 1 | 1 | 1 | 1 |
| 1 | 0 | 0 | 0 | 0 | 0 | 0 | 0 | 0 | 0 | 0 | * | 1 | 1 | 1 | 1 | 1 | 1 | 1 | 1 |
| 1 | 0 | 0 | 1 | 0 | 0 | 0 | 0 | 0 | 0 | * | 1 | 1 | 1 | 1 | 1 | 1 | 1 | 1 | 1 |
| 1 | 0 | 1 | 0 | 0 | 0 | 0 | 0 | 0 | * | 1 | 1 | 1 | 1 | 1 | 1 | 1 | 1 | 1 | 1 |
| 1 | 0 | 1 | 1 | 0 | 0 | 0 | 0 | * | 1 | 1 | 1 | 1 | 1 | 1 | 1 | 1 | 1 | 1 | 1 |

TABLE 6-continued

| INPUTS | | | | OUTPUTS | | | | | | | | | | | | | | | |
|---|---|---|---|---|---|---|---|---|---|---|---|---|---|---|---|---|---|---|---|
| | | | | 63 | 59 | 55 | 51 | 47 | 43 | 39 | 35 | 31 | 27 | 23 | 19 | 15 | 11 | 7 | 3 |
| B | C | D | E | 60 | 56 | 52 | 48 | 44 | 40 | 36 | 32 | 28 | 24 | 20 | 16 | 12 | 8 | 4 | 0 |
| 1 | 1 | 0 | 0 | 0 | 0 | 0 | * | 1 | 1 | 1 | 1 | 1 | 1 | 1 | 1 | 1 | 1 | 1 | 1 |
| 1 | 1 | 0 | 1 | 0 | 0 | * | 1 | 1 | 1 | 1 | 1 | 1 | 1 | 1 | 1 | 1 | 1 | 1 | 1 |
| 1 | 1 | 1 | 0 | 0 | * | 1 | 1 | 1 | 1 | 1 | 1 | 1 | 1 | 1 | 1 | 1 | 1 | 1 | 1 |

As discussed above, the decoders 12, 14 and 16 each impart two logic delays in the mask generation process. Pursuant to the principles of the present invention, the primary selectors 26 and the secondary selectors 20 each only impart a single logic delay in the mask generation process. Thus, a 64-bit mask is produced by the mask generator using only four logic delays.

Those skilled in the art will recognize that to generate masks having alternating strings of 0s and 1s, two or more mask generators formed in accordance with the present invention could be employed, possibly with differing polarity. The outputs of the mask generators can then be concatenated to produce the alternating series.

Those skilled in the art will recognize that the principles of the present invention apply to mask generation for an arbitrary length input string and an arbitrary length output mask. The 4-bit input/16-bit output; and 6-bit input and 64-bit output implementations disclosed herein are merely exemplary embodiments. Also, the decoders are not necessary, assuming that one provides, in the input string, values to properly place in a mask or values suitable to operate the selectors.

While the invention has been described in detail herein in accordance with certain preferred embodiments thereof, many modifications and changes therein may be effected by those skilled in the art. Accordingly, it is intended by the following claims to cover all such modifications and changes as fall within the true spirit and scope of the invention.

What is claimed is:

1. A method for generating a mask from an input string in a computer system, said input string including at least first and second portions, said method comprising:

decoding the first portion of the input string into an intermediate string having a first length; and positioning the intermediate string at a position in a first mask according to a value of the second portion of the input string, the first mask having a second length, the second length being greater than the first length.

2. The method of claim 1, wherein said decoding includes setting N contiguous low order bits in said intermediate string to a first binary value, N being derived from a value of the first portion of the input string.

3. The method of claim 1, wherein said positioning the intermediate string includes:

setting any low order bits remaining in the first mask to a first binary value; and setting any high order bits remaining in the first mask to a second binary value.

4. The method of claim 3, wherein the input string further includes a third portion, said method further comprising:

positioning the first mask at a position in a second mask according to a value of the third portion of the input string, the second mask having a third length, the third length being greater than the second length.

5. The method of claim 4, wherein said positioning the first mask includes:

setting any low order bits remaining in the second mask to the first binary value; and setting any high order bits remaining in the second mask to the second binary value.

6. The method of claim 5, further comprising:

for a different input string, performing the steps of decoding, positioning another intermediate string, and positioning another first mask, thereby generating a third mask from the different input string; and concatenating the second mask and the third mask thereby generating a fourth mask.

7. The method of claim 3, further comprising:

for a different input string, performing the steps of decoding and positioning another intermediate string thereby generating a second mask from the different input string; and concatenating the first mask and the second mask thereby generating a third mask.

8. A system for generating a mask from an input string, said input string including at least first and second portions, said system comprising:

means for decoding the first portion of the input string into an intermediate string having a first length; and means for positioning the intermediate string at a position in a first mask according to a value of the second portion of the input string, the first mask having a second length, the second length being greater than the first length.

9. The system of claim 8, wherein said means for decoding includes means for setting N contiguous low order bits in said intermediate string to a first binary value, N being derived from a value of the first portion of the input string.

10. The system of claim 8, wherein said means for positioning the intermediate string includes:

means for setting any low order bits remaining in the first mask to a first binary value; and means for setting any high order bits remaining in the first mask to a second binary value.

11. The system of claim 10, wherein the input string further includes a third portion, said system further comprising:

means for positioning the first mask at a position in a second mask according to a value of the third portion of the input string, the second mask having a third length, the third length being greater than the second length.

12. The system of claim 11, wherein said means for positioning the first mask includes:

means for setting any low order bits remaining in the second mask to the first binary value; and means for setting any high order bits remaining in the second mask to the second binary value.

13. The system of claim 12, further comprising:

for a different input string, means for decoding, means for positioning another intermediate string, and means for positioning another first mask, thereby generating a third mask from the different input string; and means for concatenating the second mask and the third mask thereby generating a fourth mask.

14. The system of claim 10, further comprising:

for a different input string, means for decoding and means for positioning another intermediate string thereby generating a second mask from the different input string; and means for concatenating the first mask and the second mask thereby generating a third mask.

15. A mask generator, comprising:

a first selector having at least one input for a first string, and an output for providing a first mask, the first mask having first, second and third portions, the first selector further including:

a first stage having an input for the first string, the first stage selectively providing in the first portion of the first mask the first string or a string of first values;

a second stage having an input for the first string, the second stage selectively providing in the second portion of the first mask the first string, the string of first values, or a string of second values; and a third stage having an input for the first string, the third stage selectively providing in the third portion of the first mask the first string or the string of second values.

16. The mask generator of claim 15, wherein the mask generator produces the first mask from an input string, the input string including at least first and second portions, the mask generator further comprising:

a first decoder having an input for the first portion of the input string and an output, the first decoder including logic for decoding the first portion of the input string into the first string.

17. The mask generator of claim 15, wherein selection signals are derived from a portion of the input string, the selection signals being applied to the first selector.

18. The mask generator of claim 17, further comprising:

a second decoder having an input for the second portion of the input string and an output, the second decoder including logic for decoding the second portion of the input string into the selection signals.

19. The mask generator of claim 15, further comprising:

a second selector having at least one input for the first mask, and an output for providing a second mask, the second selector placing the first mask in the second mask at a position derived from a portion of the input string.

20. A mask generator, comprising:

at least one input for an input bit string, the input bit string having at least first and second portions;

a first decoder coupled to said at least one input for accepting the first portion of the input bit string therefrom, the first decoder including logic for decoding the first portion of the input bit string into an intermediate bit string; and at least one first selector coupled to the output of the first decoder for producing a first mask, the at least one first selector placing the intermediate bit string in the first mask at a position determined by the second portion of the input bit string.

21. The mask generator of claim 20, wherein the input bit string includes a third portion, the mask generator further comprising:

a second selector coupled to the at least one first selector for receiving the first mask therefrom, the second selector placing the first mask in a second mask at a position derived from the third portion of the input bit string.

22. The mask generator of claim 21, further comprising:

a second decoder coupled to said at least one input for accepting the second portion of the input bit string therefrom, the second decoder including logic for decoding the second portion of the input bit string into first selection bits for use by the at least one first selector when placing the intermediate bit string in the first mask.

23. The mask generator of claim 22, further comprising:

a third decoder coupled to said at least one input for accepting the third portion of the input bit string therefrom, the third decoder including logic for decoding the third portion of the input bit string into second selection bits for use by the second selector when placing the first mask in the second mask.

24. The mask generator of claim 23, further comprising:

a plurality of first selectors, the plurality of first selectors including the at least one first selector, each first selector corresponding to a respective portion of the second mask, each first selector coupled to the output of the first decoder for producing a respective first mask, the intermediate bit string being placed by each first selector in its respective first mask at a respective position indicated by the first selection bits decoded by the said second decoder.

25. A mask generator for producing an output mask from an input bit string, the input bit string having at least first and second portions, said mask generator comprising:

a first primary selector for producing an intermediate mask, the intermediate mask being smaller than the output mask, the first primary selector placing at least one bit in the intermediate mask at a position derived from the first portion of the input bit string; and a secondary selector coupled to the first primary selector for producing the output mask, the secondary selector placing the intermediate mask in the output mask at a position derived from the second portion of the input bit string.

26. The mask generator of claim 25, further comprising:

at least second and third primary selectors, the first, second and third primary selectors each being associated with respective first, second and third portions of the output mask, each of the primary selectors producing respective first, second and third intermediate masks, the at least one bit being placed by each primary selector in its respective intermediate mask at a respective position derived from the first portion of the input bit string.

27. The mask generator of claim 26, wherein the secondary selector includes first, second and third stages, each of the first, second and third stages of the secondary selector receiving a respective intermediate mask from a respective first, second or third primary selector, wherein:

the first stage of the secondary selector selectively provides in the first portion of the output mask the first intermediate mask or a first string of first values;

the second stage of the secondary selector selectively provides in the second portion of the output mask the second intermediate mask, the first string of first values, or a first string of second values; and the third stage of the secondary selector selectively provides in the third portion of the output mask the third intermediate mask or the first string of second values.

28. The mask generator of claim 27, wherein the input bit string includes a third portion, the mask generator further comprising:

a decoder for deriving the at least one bit from the third portion of the input bit string.

29. The mask generator of claim 27, further comprising:

a decoder for deriving selection signals from the first portion of the input bit string and providing the selection signals to said first, second and third primary selectors.

30. The mask generator of claim 27, further comprising:

a decoder for deriving selection signals from the second portion of the input bit string and providing the selection signals to said secondary selector.

31. The mask generator of claim 27, wherein each of the first, second and third primary selectors includes:

a first stage for selectively providing in a first portion of the first intermediate mask the at least one bit or a second string of first values;

a second stage for selectively providing in a second portion of the second intermediate mask the at least one bit, the second string of first values, or a second string of second values; and a third stage for selectively providing in a third portion of the third intermediate mask the at least one bit or the second string of second values.

* * * * *

UNITED STATES PATENT AND TRADEMARK OFFICE
CERTIFICATE OF CORRECTION

PATENT NO.    :  5,745,744
DATED         :  April 28, 1998
INVENTOR(S)   :  Bechade It is certified that error appears in the above-identified patent and that said Letters Patent is hereby corrected as shown below:

Column 7, Lines 10-30,
Table 5  INPUTS, Columns D-G

| | | | |
|---|---|---|---|
| Row 11, "1 1 1 0" | should read | --1 0 1 0-- |
| Row 12, "1 1 1 1" | should read | --1 0 1 1-- |
| Row 13, "1 0 0 0" | should read | --1 1 0 0-- |
| Row 14, "1 0 0 1" | should read | --1 1 0 1-- |

Signed and Sealed this

Eighth Day of December, 1998

Attest:

BRUCE LEHMAN

Attesting Officer    Commissioner of Patents and Trademarks